US012300429B2

(12) United States Patent
Gomyo

(10) Patent No.: US 12,300,429 B2
(45) Date of Patent: May 13, 2025

(54) SUPERCONDUCTING ELECTROMAGNET DEVICE

(71) Applicant: Canon Medical Systems Corporation, Tochigi (JP)

(72) Inventor: Taisaku Gomyo, Tokyo (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 216 days.

(21) Appl. No.: 17/785,401

(22) PCT Filed: Mar. 4, 2020

(86) PCT No.: PCT/JP2020/009210
§ 371 (c)(1),
(2) Date: Jun. 15, 2022

(87) PCT Pub. No.: WO2021/176604
PCT Pub. Date: Sep. 10, 2021

(65) Prior Publication Data
US 2023/0010217 A1 Jan. 12, 2023

(51) Int. Cl.
*H01F 6/04* (2006.01)

(52) U.S. Cl.
CPC .................................... *H01F 6/04* (2013.01)

(58) Field of Classification Search
CPC ........................................................ H01F 6/04
(Continued)

(56) References Cited

U.S. PATENT DOCUMENTS 4,689,970 A * 9/1987 Ohguma .................. H01F 6/04 62/51.1
5,613,367 A * 3/1997 Chen ......................... H01F 6/04 62/51.1
(Continued)

FOREIGN PATENT DOCUMENTS

EP 1739446 A1 1/2007
JP 2007-7111 A 1/2007
(Continued)

OTHER PUBLICATIONS

International Search Report and Written Opinion mailed on Jun. 2, 2020, received for PCT Application PCT/JP2020/009210, filed on Mar. 4, 2020, 8 pages including English Translation.

*Primary Examiner* — Alexander Talpalatski
(74) *Attorney, Agent, or Firm* — XSENSUS LLP

(57) ABSTRACT

The superconducting electromagnet device includes a superconducting coil, a refrigerant container, a refrigerator, a heat exchanger, and a cooling cylinder. The refrigerant container accommodates refrigerant that cools the superconducting coil. The refrigerator includes a refrigeration stage. The heat exchanger is arranged inside the refrigerant container and connected to the refrigeration stage to cool refrigerant gas vaporized from the refrigerant. The cooling cylinder includes a bottom and a peripheral wall erected from an outer edge of the bottom, and is arranged inside the refrigerant container to surround the heat exchanger. The cooling cylinder is provided with an opening, through which the refrigerant gas flows, in the peripheral wall. The cooling cylinder stores liquid refrigerant recondensed by the heat exchanger on the bottom.

16 Claims, 9 Drawing Sheets

(58) Field of Classification Search
USPC .......................................................... 335/216
See application file for complete search history.

(56) References Cited

U.S. PATENT DOCUMENTS

| | | | | |
|---|---|---|---|---|
| 5,936,499 | A * | 8/1999 | Eckels | G01R 33/3804 505/892 |
| 6,107,905 | A * | 8/2000 | Itoh | F25D 19/006 505/892 |
| 7,310,954 | B2 * | 12/2007 | Miki | C01B 3/0089 62/51.1 |
| 7,323,963 | B2 * | 1/2008 | Nemoto | G01R 33/3815 62/51.1 |
| 9,230,724 | B2 * | 1/2016 | Harrison | F25D 19/00 |
| 10,002,697 | B2 * | 6/2018 | Oka | H01F 6/06 |
| 10,490,329 | B2 * | 11/2019 | Eguchi | H01F 6/02 |
| 10,731,914 | B2 * | 8/2020 | Morie | F25B 9/10 |
| 2007/0001792 | A1 * | 1/2007 | Nemoto | G01R 33/421 335/216 |
| 2010/0089073 | A1 * | 4/2010 | Laskaris | H01F 6/04 62/51.1 |
| 2013/0008187 | A1 * | 1/2013 | Kraus | F25D 3/10 62/51.1 |
| 2014/0274724 | A1 * | 9/2014 | Inoue | H01F 6/04 335/216 |
| 2015/0011395 | A1 * | 1/2015 | Hu | H01F 6/04 62/51.1 |
| 2015/0099640 | A1 * | 4/2015 | Kasahara | H01B 12/06 361/699 |
| 2016/0055949 | A1 * | 2/2016 | Tago | H01F 6/04 62/51.1 |

FOREIGN PATENT DOCUMENTS

| | | | |
|---|---|---|---|
| JP | 2012-502252 | A | 1/2012 |
| JP | 2013-53824 | A | 3/2013 |
| WO | 2010/029456 | A2 | 3/2010 |

* cited by examiner

SUPERCONDUCTING ELECTROMAGNET DEVICE

CROSS-REFERENCE TO RELATED APPLICATION

The present application is based on PCT filing PCT/JP2020/009210, filed Mar. 4, 2020, the entire contents of which are incorporated herein by reference.

TECHNICAL FIELD

The present disclosure relates to a superconducting electromagnet device.

BACKGROUND ART

As a prior document, Japanese Patent Laying-Open No. 2013-53824 (PTL 1) discloses a superconducting magnet. The superconducting magnet disclosed in PTL 1 includes a superconducting coil, a vacuum chamber, a refrigerator, and a heat exchanger. The heat exchanger has a liquid refrigerant removal mechanism.

CITATION LIST

Patent Literature

PTL 1: Japanese Patent Laying-Open No. 2013-53824

SUMMARY OF INVENTION

Technical Problem

In a superconducting electromagnet device, when heat enters a refrigerant container from the outside, the heat may vaporize liquid refrigerant to generate refrigerant gas. In order to prevent the pressure inside the refrigerant container from being increased by the refrigerant gas, during the operation of the superconducting electromagnet device, the refrigerator is continuously operated to recondense the refrigerant gas. In order to ensure the amount of liquid refrigerant required to cool the superconducting coil while reducing the amount of power consumed by the refrigerator, it is required to increase the amount of refrigerant to be recondensed per unit time.

The present disclosure has been made in view of the problem mentioned above, and an object of the present disclosure is to provide a superconducting electromagnet device capable of increasing the amount of refrigerant to be recondensed per unit time.

Solution to Problem

A superconducting electromagnet device according to the present disclosure includes a superconducting coil, a refrigerant container, a refrigerator, a heat exchanger, and a cooling cylinder. The refrigerant container accommodates liquid refrigerant that cools the superconducting coil. The refrigerator has a refrigeration stage. The heat exchanger is disposed inside the refrigerant container and connected to the refrigeration stage to cool refrigerant gas vaporized from liquid refrigerant. The cooling cylinder has a bottom and a peripheral wall erected from an outer edge of the bottom, and is arranged inside the refrigerant container to surround the heat exchanger. The cooling cylinder is provided with an opening, through which the refrigerant gas flows, in the peripheral wall and stores the liquid refrigerant recondensed by the heat exchanger on the bottom.

ADVANTAGEOUS EFFECTS OF INVENTION

According to the present disclosure, it is possible to decrease the temperature of the cooling cylinder by using the latent heat of the liquid refrigerant stored on the bottom of the cooling cylinder. Due to the temperature decrease of the cooling cylinder, it is possible to cool the refrigerant gas present around the cooling cylinder. The low-temperature refrigerant gas passes through an opening of the cooling cylinder and is supplied to the heat exchanger. Accordingly, it is possible to increase the condensation heat transfer rate of the heat exchanger, which makes it possible to increase the amount of refrigerant to be recondensed per unit time.

DESCRIPTION OF EMBODIMENTS

Figure 1:
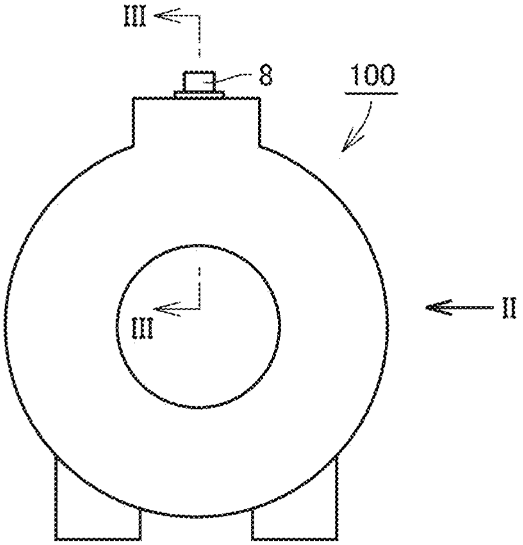
FIG. 1 is a front view illustrating a superconducting electromagnet device according to a first embodiment.

Hereinafter, a superconducting electromagnet device according to each embodiment will be described with reference to the drawings. In the following description of each embodiment, the same or corresponding portions in the drawings will be denoted by the same reference numerals, and the description thereof will not be repeated. In the following embodiments, a cylindrical superconducting electromagnet device will be described, but the present disclosure is not limited to the cylindrical superconducting electromagnet device.

First Embodiment

Figure 2:
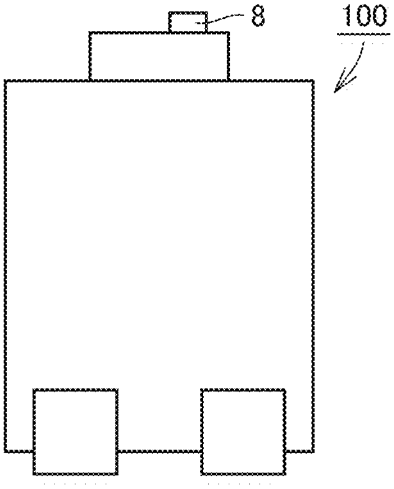
FIG. 2 is a side view illustrating the superconducting electromagnet device of FIG. 1 when viewed from the direction of an arrow II.
Figure 3:
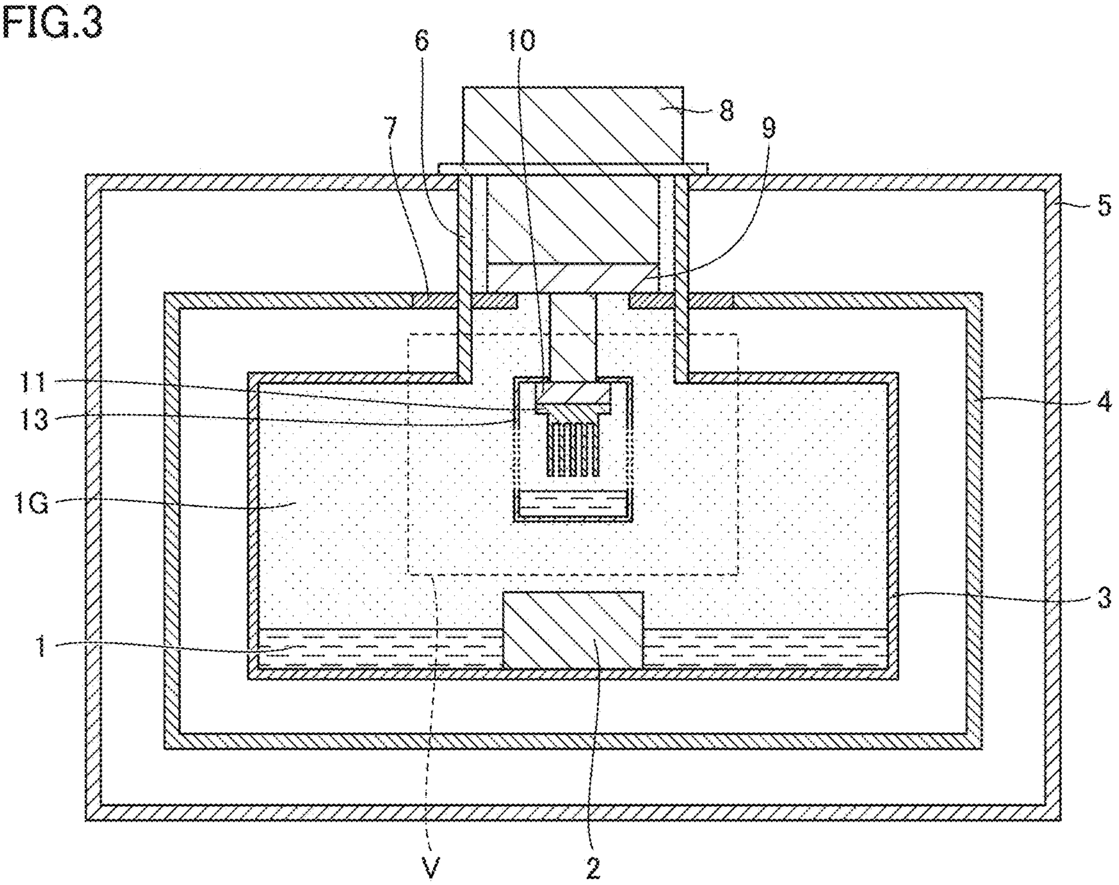
FIG. 3 is a cross-sectional view illustrating the superconducting electromagnet device of FIG. 1 taken along line III-III.

FIG. 1 is a front view illustrating a superconducting electromagnet device according to a first embodiment. FIG. 2 is a side view illustrating the superconducting electromagnet device of FIG. 1 when viewed from the direction of an arrow II. FIG. 3 is a cross-sectional view illustrating the superconducting electromagnet device of FIG. 1 taken along line III-III.

As illustrated in FIGS. 1 to 3, a superconducting electromagnet device 100 includes a superconducting coil 2, a refrigerant container 3, a refrigerator 8, a heat exchanger 11, and a cooling cylinder 13. The superconducting electromagnet device 100 further includes a radiation shield 4, a vacuum chamber 5, a refrigerator housing pipe 6, and a thermal anchor 7.

The superconducting coil 2 is arranged in direct or indirect contact with liquid refrigerant 1 so as to be cooled to the critical temperature or lower by the sensible heat or latent heat of the liquid refrigerant 1. As illustrated in FIG. 3, in the present embodiment, the superconducting coil 2 is immersed in the liquid refrigerant 1, and thereby, the superconducting coil 2 is cooled by the liquid refrigerant 1 due to the direct contact with the liquid refrigerant 1. However, the superconducting coil 2 may be arranged in contact with a pipe which is connected to the refrigerant container 3 and filled with the liquid refrigerant 1, and thereby, the superconducting coil 2 is cooled by the liquid refrigerant 1 due to the indirect contact with the liquid refrigerant 1.

The refrigerant container 3 accommodates the refrigerant 1 for cooling the superconducting coil 2. As the refrigerant 1, any material such as helium, hydrogen, nitrogen, or the like, which has a boiling point lower than a critical temperature where the superconducting coil 2 becomes superconductive, may be used. The refrigerant container 3 is made of nonmagnetic metal such as stainless steel.

The radiation shield 4 is arranged to surround the refrigerant container 3 and separated from the refrigerant container 3 with an interval. The radiation shield 4 reduces heat radiated from the vacuum chamber 5 to the refrigerant container 3. The radiation shield 4 is preferably made of a material having a high light reflectivity and a high thermal conductivity such as aluminum.

The vacuum chamber 5 accommodates the refrigerant container 3 and the radiation shield 4. In order to improve the heat insulating property of the refrigerant container 3, an inner space of the vacuum chamber 5 is depressurized to high vacuum. More specifically, an space between an inner surface of the vacuum chamber 5 and an outer surface of the refrigerant container 3 is high vacuum. The vacuum chamber 5 is made of stainless steel, for example.

The refrigerator housing pipe 6 is connected between an outer surface of the vacuum chamber 5 and the refrigerant container 3. The refrigerator housing pipe 6 is in communication with the refrigerant container 3. The thermal anchor 7 is disposed at a central portion of the refrigerator housing pipe 6 in the longitudinal direction. The thermal anchor 7 is a block member made of a material having a high thermal conductivity such as copper or aluminum, and is connected to the radiation shield 4 via a flexible conductor (not shown).

The refrigerator 8 is inserted in the refrigerator housing pipe 6. The refrigerator 8 has a first refrigeration stage 9 and a second refrigeration stage 10. As the refrigerator 8, a Gifford-McMahon refrigerator or a pulse tube refrigerator having two refrigeration stages may be used. The first refrigeration stage 9 cools the thermal anchor 7.

The cooling capacity of the refrigerator 8 varies depending on the temperature of the first refrigeration stage 9 and the temperature of the second refrigeration stage 10. When helium is used as the refrigerant 1, the temperature of the first refrigeration stage 9 of the refrigerator 8 is, for example, 30 K or more and 60 K or less, and the cooling capacity of the first refrigeration stage is, for example, 20 W or more and 70 W or less; while the temperature of the second refrigeration stage 10 is, for example, 4 K, and the cooling capacity of the second refrigeration stage 10 is, for example, 1 W.

The heat exchanger 11 is disposed inside the refrigerant container 3 and connected to the second refrigeration stage 10 to cool refrigerant gas 1G. The heat exchanger 11 has a fin 12 so as to increase heat exchange area. The heat exchanger 11 is arranged inside the refrigerant container 3 at a position where the refrigerant gas 1G is present.

The fin 12 extends toward the bottom of the cooling cylinder 13, which will be described later. Although the fin 12 has a comb shape in the present embodiment, the fin 12 is not limited to the comb shape as long as it can increase the heat exchange area. For example, the fin 12 may have a pin shape. The refrigerant gas 1G present around the heat exchanger 11 is recondensed on the surface of the heat exchanger 11 into the liquid refrigerant 1.

Figure 4:
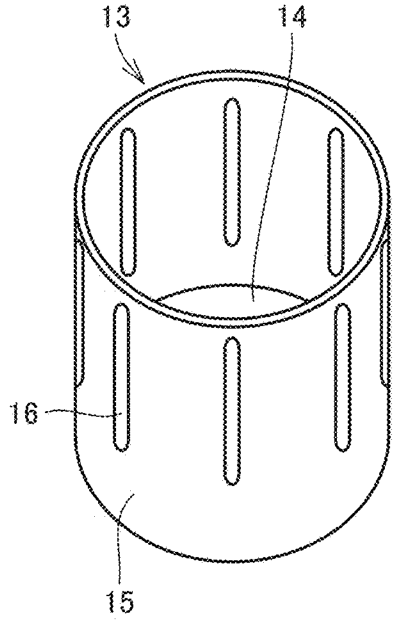
FIG. 4 is a perspective view illustrating a cooling cylinder included in the superconducting electromagnet device according to the first embodiment.

FIG. 4 is a perspective view illustrating a cooling cylinder included in the superconducting electromagnet device according to the first embodiment. In FIG. 4, a lid of the cooling cylinder 13, which will be described later, is not shown. As illustrated in FIG. 4, the cooling cylinder 13 has a bottom 14 and a peripheral wall 15 erected from an outer edge of the bottom 14. The cooling cylinder 13 is arranged inside the refrigerant container 3 to surround the heat exchanger 11. The cooling cylinder 13 is provided with an opening 16, through which the refrigerant gas 1G flows, in the peripheral wall 15 and stores the liquid refrigerant 1 recondensed by the heat exchanger 11 on the bottom 14. In the present embodiment, the cooling cylinder 13 is a bottomed cylinder, but it may a bottomed square tube.

Figure 5:
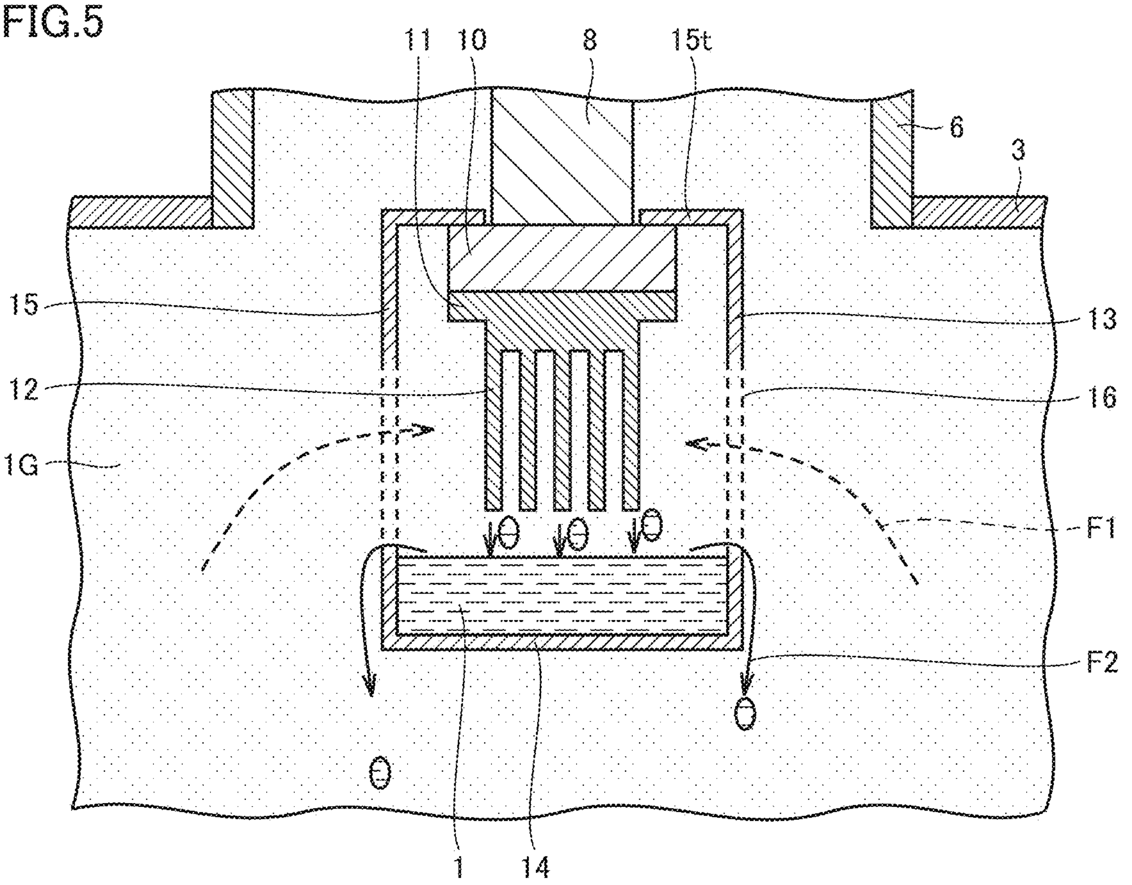
FIG. 5 is an enlarged cross-sectional view illustrating the flow of refrigerant inside the cooling cylinder included in the superconducting electromagnet device according to the first embodiment.

The cooling cylinder 13 is connected to the second refrigeration stage 10. In the present embodiment, as illustrated in FIGS. 3 and 5, the cooling cylinder 13 has a lid 15*t* extending inward from the upper end of the peripheral wall 15. The lid 15*t* of the cooling cylinder 13 is connected to the second refrigeration stage 10. The lid 15*t* is provided with a hole through which the second refrigeration stage 10 and the heat exchanger 11 are inserted. After the second refrigeration stage 10 and the heat exchanger 11 are inserted through the hole, the cooling cylinder 13 is rotated in the circumferential direction, whereby the lid 15*t* is connected to the second refrigeration stage 10 as illustrated in FIGS. 3 and 5. The cooling cylinder 13 may be connected to the heat exchanger 11 instead of the second refrigeration stage 10. The cooling cylinder 13 is made of a material having a high thermal conductivity such as copper or aluminum.

Although in the present embodiment the opening 16 is formed into a slit, the opening 16 may be formed into a round hole or a mesh as long as it allows the refrigerant 1 to flow therethrough. It is desirable that at least a part of the opening 16 is located lower than the lower end of the heat exchanger 11, but the position of the opening 16 is not necessarily limited thereto.

FIG. 5 is an enlarged cross-sectional view illustrating the flow of refrigerant inside the cooling cylinder included in the superconducting electromagnet device according to the first embodiment. Since the superconducting electromagnet device 100 is installed in a room temperature environment, heat may enter the radiation shield 4 from the vacuum chamber 5, and then enter the refrigerant container 3 from the radiation shield 4. The heat entering the refrigerant container 3 may vaporize the liquid refrigerant 1 in the refrigerant container 3 into the refrigerant gas 1G. As illustrated in FIGS. 3 and 5, the refrigerant gas 1G is accumulated in an upper portion of the refrigerant container 3 due to buoyancy. When the refrigerant gas 1G continues to be generated inside the refrigerant container 3, the inner pressure of the refrigerant container 3 will rise. The heat exchanger 11 connected to the second refrigeration stage 10 of the refrigerator 8 cools the refrigerant gas 1G and recondense the refrigerant gas 1G into the liquid refrigerant 1, which keeps the inner pressure of the refrigerant container 3 constant.

The cooling cylinder 13 is cooled to a temperature around the boiling point of the refrigerant 1 by the second refrigeration stage 10 and the latent heat of the liquid refrigerant 1 stored inside the cooling cylinder 13 on the bottom 14. The temperature of the refrigerant gas 1G near the gas-liquid interface between the liquid refrigerant 1 and the refrigerant gas 1G is close to the boiling point of the refrigerant 1. For example, when the refrigerant 1 is helium, the temperature of the refrigerant gas 1G near the gas-liquid interface is about 4.2 K. Since the density of the refrigerant gas 1G decreases toward the upper portion of the refrigerant container 3, the temperature of the refrigerant gas 1G becomes higher than the boiling point of the refrigerant 1. Since the temperature of the cooling cylinder 13 located in the upper portion of the refrigerant container 3 is lower than that of the refrigerant gas 1G present around the cooling cylinder 13, the refrigerant gas 1G may be cooled by the cooling cylinder 13.

As indicated by a dotted arrow F1, the refrigerant gas 1G cooled by the cooling cylinder 13 flows through the opening 16 provided in the cooling cylinder 13 into the heat exchanger 11, the refrigerant gas 1G is cooled by the heat exchanger 11 and is recondensed into the liquid refrigerant 1. The liquid refrigerant 1 drops down along the surface of the heat exchanger 11 and the surface of the fin 12, and is stored on the bottom 14 in the cooling cylinder 13.

In the first embodiment, when the amount of the refrigerant 1 stored on the bottom 14 increases and the liquid level of the refrigerant 1 reaches the opening 16, as indicated by a solid arrow F2, the liquid refrigerant 1 is discharged from the opening 16 and flows toward the lower portion of the refrigerant container 3.

Generally, in a space filled with a single component gas, when a heat transfer surface has a temperature lower than the boiling point of the gas, the gas will condense on the heat transfer surface to form a liquid film on the heat transfer surface. At this time, the condensation thermal resistance around the heat transfer surface is equal to the sum of the convection thermal resistance when the temperature of the gas is lowered to the boiling point and the thermal resistance of the condensed liquid film. The smaller the condensation thermal resistance, the greater the amount of the refrigerant gas to be recondensed per unit time.

The convection heat resistance decreases as the difference between the temperature of the gas present around the heat transfer surface and the temperature of the heat transfer surface becomes smaller. The thermal resistance of the liquid film decreases as the thickness of the liquid film formed on the heat transfer surface becomes smaller or as the latent heat of the refrigerant becomes smaller. Since the refrigerant 1 used in the superconducting electromagnet device 100 has an extremely low boiling point and thus has a small latent heat, and thereby the thermal resistance of the liquid film is smaller. Therefore, the influence of the convection thermal resistance in the condensation thermal resistance becomes greater.

In the superconducting electromagnet device 100 according to the present embodiment, since the cooling cylinder 13 is arranged inside the refrigerant container 3 to surround the heat exchanger 11, it is possible to lower the temperature of the cooling cylinder 13 by using the latent heat of the liquid refrigerant 1 stored on the bottom 14 of the cooling cylinder 13. Since the temperature of the cooling cylinder 13 is lowered, it is possible to cool the refrigerant gas 1G present around the cooling cylinder 13. Then, the low-temperature refrigerant gas 1G passes through the opening 16 of the cooling cylinder 13 and is supplied to the heat exchanger 11. As a result, the difference between the temperature of the refrigerant gas 1G present around the heat exchanger 11 and the temperature of the heat exchanger 11 becomes smaller, which makes it possible to reduce the convection heat resistance and the condensation heat resistance. Thereby, it is possible to increase the condensation heat transfer rate of the heat exchanger 11, which makes it possible to increase the amount of the refrigerant 1 to be recondensed per unit time.

In the superconducting electromagnet device 100 according to the present embodiment, the cooling cylinder 13 is connected to one of the second refrigeration stage 10 and the heat exchanger 11. Thus, it is possible to effectively cool the cooling cylinder 13 by using the second refrigeration stage 10 or the heat exchanger 11 and the liquid refrigerant 1 stored on the bottom 14.

Second Embodiment

Hereinafter, a superconducting electromagnet device according to a second embodiment will be described. The superconducting electromagnet device according to the second embodiment is different from that of the first embodiment only on the cooling cylinder, and the description of the other components will not be repeated.

Figure 6:
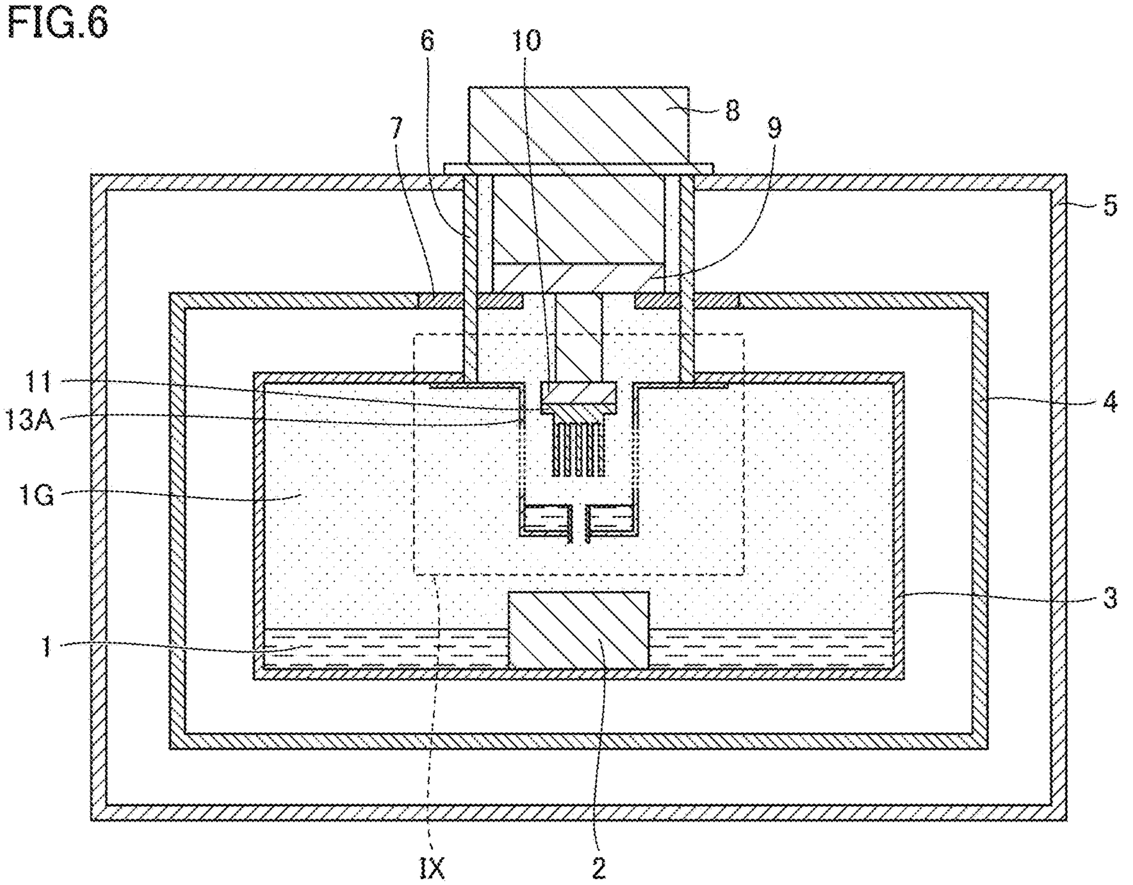
FIG. 6 is a cross-sectional view illustrating a superconducting electromagnet device according to a second embodiment.

FIG. 6 is a cross-sectional view illustrating a superconducting electromagnet device according to the second embodiment. The cross-sectional view illustrated in FIG. 6 is the same as that illustrated in FIG. 3. As illustrated in FIG. 6, in the second embodiment, the cooling cylinder 13A arranged around the heat exchanger 11 is disposed inside the refrigerant container 3 and connected to the refrigerant container 3.

Figure 7:
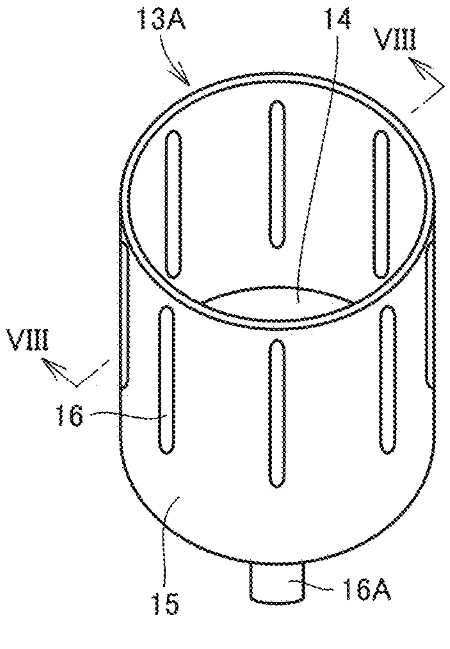
FIG. 7 is a perspective view illustrating a cooling cylinder included in the superconducting electromagnet device according to the second embodiment.
Figure 8:
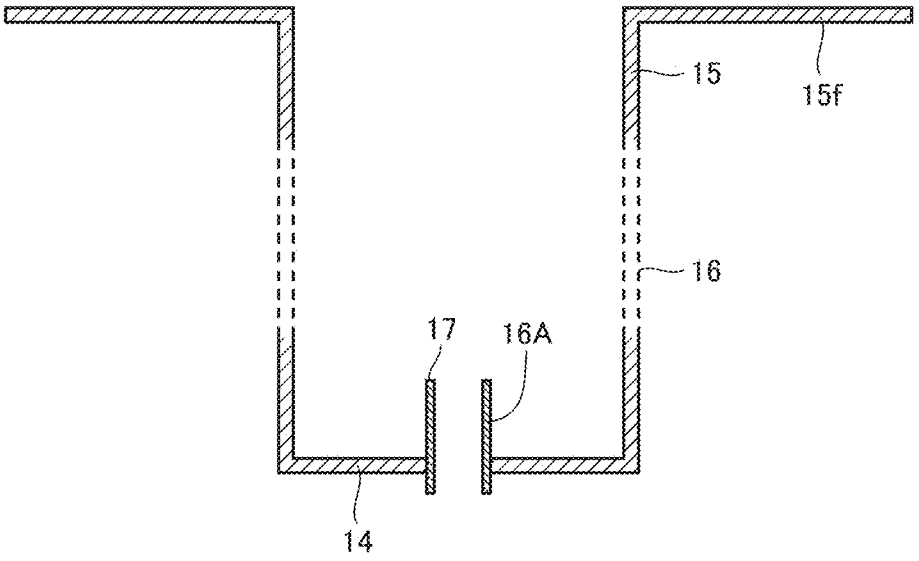
FIG. 8 is a cross-sectional view illustrating the cooling cylinder of FIG. 7 taken along line VIII-VIII.

FIG. 7 is a perspective view illustrating the cooling cylinder included in the superconducting electromagnet device according to the second embodiment. FIG. 8 is a cross-sectional view illustrating the cooling cylinder of FIG. 7 taken along line VIII-VIII. In FIG. 7, a flange of the cooling cylinder 13A, which will be described later, is not shown.

As illustrated in FIGS. 7 and 8, the cooling cylinder 13A has a bottom 14 and a peripheral wall 15 erected from an outer edge of the bottom 14. The cooling cylinder 13A is arranged inside the refrigerant container 3 to surround the heat exchanger 11. The cooling cylinder 13A is provided with an opening 16, through which the refrigerant gas 1G flows, in the peripheral wall 15 and stores the liquid refrigerant 1 recondensed by the heat exchanger 11 on the bottom 14.

The bottom 14 is provided with a drainage tube 16A penetrating the bottom 14. The drainage tube 16A protrudes into the cooling cylinder 13A without interfering with the fin 12. An upper end 17 of the drainage tube 16A is lower than the lower end of the opening 16. Although in the present embodiment the cross-sectional shape of the drainage tube 16A is circular, the cross-sectional shape of the drainage tube 16A may be a polygon such as a rectangle as long as the refrigerant 1 is allowed to flow through the drainage tube 16A.

Figure 9:
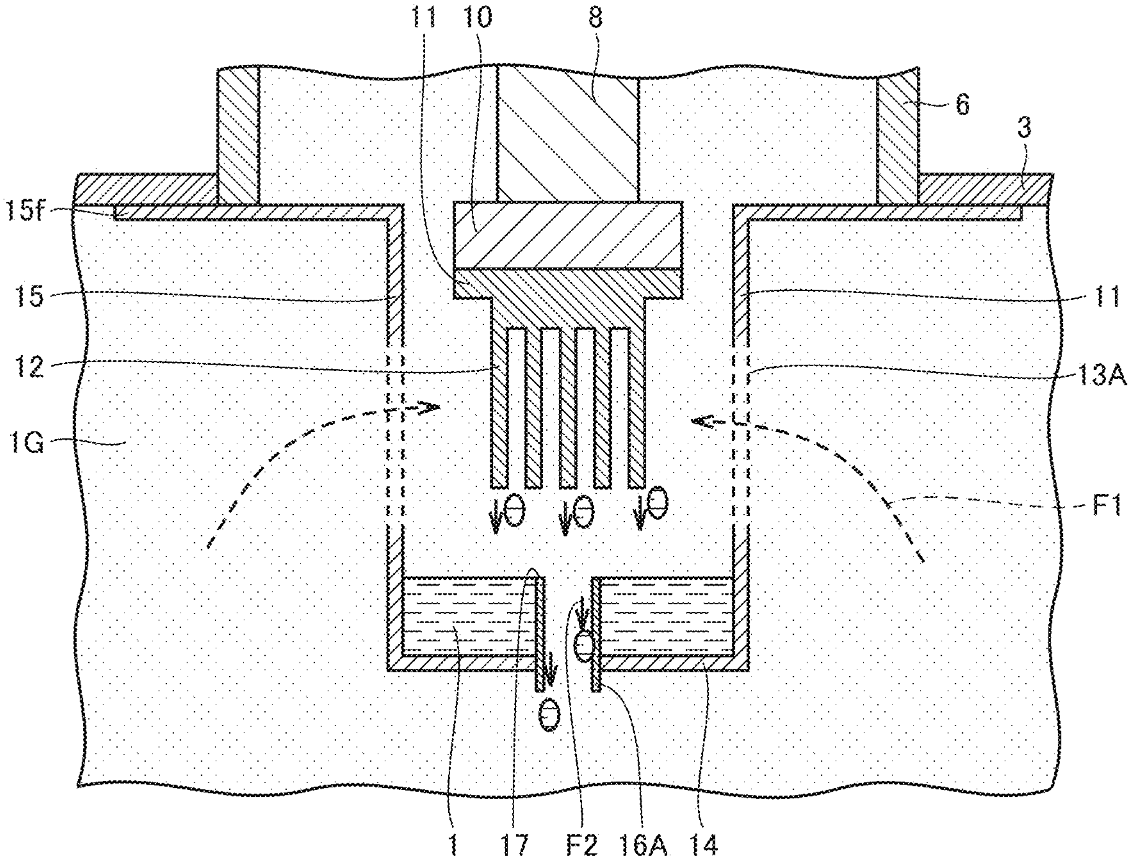
FIG. 9 is an enlarged cross-sectional view illustrating the flow of refrigerant inside the cooling cylinder included in the superconducting electromagnet device according to the second embodiment.

The cooling cylinder 13A is connected to the refrigerant container 3. As illustrated in FIGS. 8 and 9, the cooling cylinder 13A has a flange 15*f* extending outward from the upper end of the peripheral wall 15. The upper surface of the flange 15*f* of the cooling cylinder 13A is connected to the inner surface of the refrigerant container 3.

FIG. 9 is an enlarged cross-sectional view illustrating the flow of refrigerant inside the cooling cylinder included in the superconducting electromagnet device according to the second embodiment. As illustrated in FIG. 9, in the second embodiment, when the amount of the refrigerant 1 stored on the bottom 14 increases and the liquid level of the refrigerant 1 reaches the upper end 17 of the drainage tube 16A, as indicated by a solid arrow F2, the liquid refrigerant 1 is discharged from the drainage tube 16A and flows toward the lower portion of the refrigerant container 3.

Similarly, in the superconducting electromagnet device according to the present embodiment, since the cooling cylinder 13A is arranged inside the refrigerant container 3 to surround the heat exchanger 11, it is possible to increase the condensation heat transfer rate of the heat exchanger 11, which makes it possible to increase the amount of the refrigerant 1 to be recondensed per unit time.

In the superconducting electromagnet device according to the present embodiment, the cooling cylinder 13A is connected to the refrigerant container 3. Thus, the cooling cylinder 13A is not required to be connected to the second refrigeration stage 10, which makes it possible to simplify the connection of the refrigerator 8 as compared with the superconducting electromagnet device 100 according to the first embodiment.

Third Embodiment

Hereinafter, a superconducting electromagnet device according to a third embodiment will be described. The superconducting electromagnet device according to the third embodiment is different from the superconducting electromagnet device according to the second embodiment mainly on the refrigerator, the refrigerator housing pipe, and the cooling cylinder, and the description of the same components as those of the superconducting electromagnet device according to the second embodiment will not be repeated.

Figure 10:
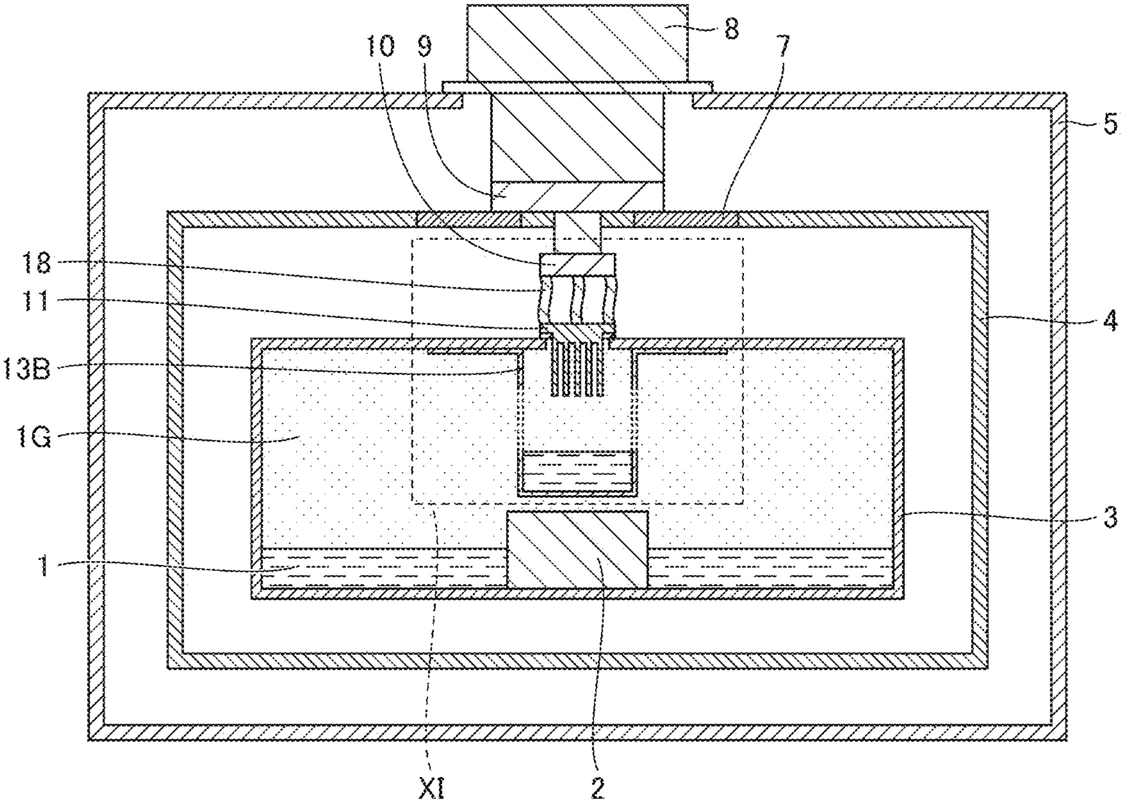
FIG. 10 is a cross-sectional view illustrating a superconducting electromagnet device according to a third embodiment.

FIG. 10 is a cross-sectional view illustrating a superconducting electromagnet device according to the third embodiment. The cross-sectional view illustrated in FIG. 10 is the same as that illustrated in FIG. 6. As illustrated in FIG. 10, in the third embodiment, the refrigerator 8 is inserted into the vacuum chamber 5. The first refrigeration stage 9 is disposed outside the radiation shield 4. The first refrigeration stage 9 and the radiation shield 4 are connected to each other via a flexible conductor (not shown) and a thermal anchor 7.

Figure 11:
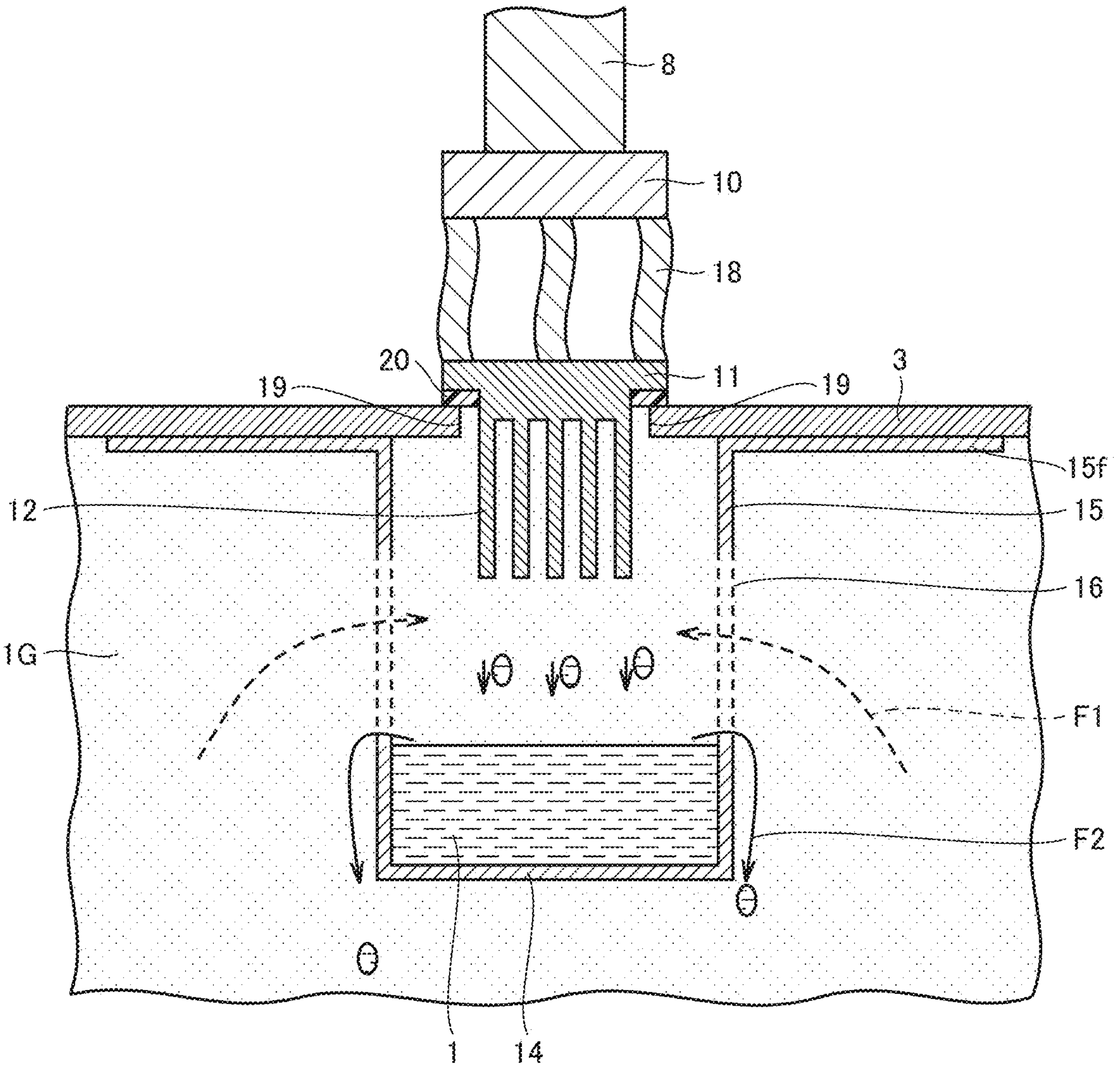
FIG. 11 is an enlarged cross-sectional view illustrating the flow of refrigerant inside the cooling cylinder included in the superconducting electromagnet device according to the third embodiment.

FIG. 11 is an enlarged cross-sectional view illustrating the flow of refrigerant inside the cooling cylinder included in the superconducting electromagnet device according to the third embodiment. As illustrated in FIG. 11, in the third embodiment, the heat exchanger 11 is inserted into the refrigerant container 3 through an insertion opening 19 provided in the refrigerant container 3. The space between the heat exchanger 11 and the insertion opening 19 is sealed by a sealing material 20 such as indium or O-ring so as to prevent the refrigerant gas 1G from flowing out of the refrigerant container 3.

In the third embodiment, the second refrigeration stage 10 is disposed outside the refrigerant container 3. The heat exchanger 11 and the second refrigeration stage 10 are connected to each other by a connection conductor 18. The connection conductor 18 is preferably flexible. The connection conductor 18 is made of a material having a high thermal conductivity such as copper.

In the third embodiment, the superconducting electromagnet device is not limited to the structure mentioned above as long as the heat exchanger 11 and the second refrigeration stage 10 are connected to each other by the connection conductor 18 and a fin 12 provided on the heat exchanger 11 is arranged inside the refrigerant container 3.

The cooling cylinder 13B is connected to the refrigerant container 3. The drainage tube 16A is not provided in the cooling cylinder 13B. As illustrated in FIG. 11, in the third embodiment, when the amount of the refrigerant 1 stored on the bottom 14 increases and the liquid level of the refrigerant 1 reaches the opening 16, as indicated by the solid arrow F2, the liquid refrigerant 1 is discharged from the opening 16 and flows toward the lower portion of the refrigerant container 3.

Similarly, in the superconducting electromagnet device according to the present embodiment, since the cooling cylinder 13B is arranged inside the refrigerant container 3 to surround the heat exchanger 11, it is possible to increase the condensation heat transfer rate of the heat exchanger 11, which makes it possible to increase the amount of the refrigerant 1 to be recondensed per unit time.

In the superconducting electromagnet device according to the present embodiment, since the second refrigeration stage 10 is disposed outside the refrigerant container 3 and the heat exchanger 11 and the second refrigeration stage 10 are connected to each other by the connection conductor 18, it is not necessary to provide the refrigerator housing pipe 6, which makes it possible to simplify the connection between the refrigerant container 3, the radiation shield 4, and the vacuum chamber 5.

Fourth Embodiment

Hereinafter, a superconducting electromagnet device according to a fourth embodiment will be described. The superconducting electromagnet device according to the fourth embodiment is different from that of the first embodiment only on the cooling cylinder and the heat exchanger, and the description of the other components will not be repeated.

Figure 12:
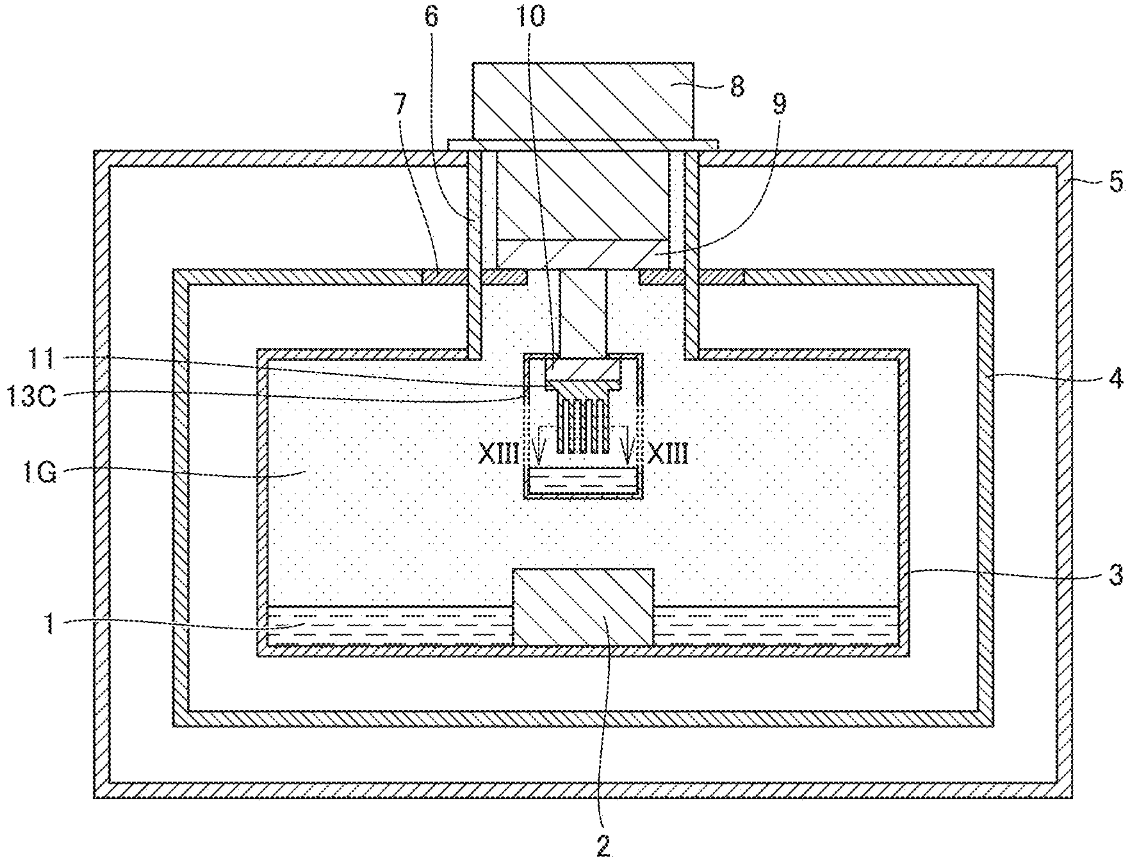
FIG. 12 is a cross-sectional view illustrating a superconducting electromagnet device according to a fourth embodiment.

FIG. 12 is a cross-sectional view illustrating the superconducting electromagnet device according to the fourth embodiment. The cross-sectional view illustrated in FIG. 12 is the same as that illustrated in FIG. 3. As illustrated in FIG. 12, in the fourth embodiment, the cooling cylinder 13C is arranged inside the refrigerant container 3 to surround the heat exchanger 11, and is connected to the second refrigeration stage 10. The heat exchanger 11 has a fin 12 so as to increase the heat exchange area.

Figure 13:
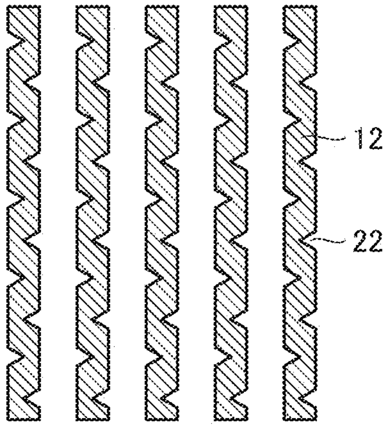
FIG. 13 is a cross-sectional view illustrating a fin provided in the heat exchanger of FIG. 12 taken along line XIII-XIII.

FIG. 13 is a cross-sectional view illustrating a fin provided in the heat exchanger of FIG. 12 taken along line XIII-XIII. As illustrated in FIG. 13, a plurality of grooves 22 are provided on the surface of the fin 12. Each of the plurality of grooves 22 on the surface of the fin 12 extends toward the bottom 14 of the cooling cylinder 13C. In the present embodiment, the cross-sectional shape of each of the plurality of grooves 22 is triangular, but it may be semicircular or rectangular. Each of the plurality of grooves 22 does not necessarily extend in the direction toward the bottom 14.

Figure 14:
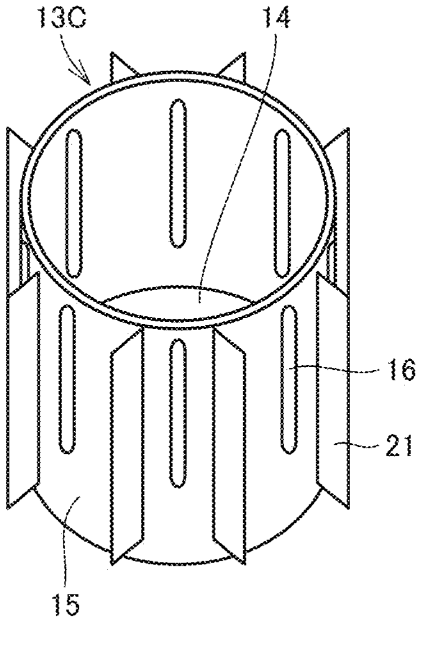
FIG. 14 is a perspective view illustrating a cooling cylinder included in the superconducting electromagnet device according to the fourth embodiment.

FIG. 14 is a perspective view illustrating a cooling cylinder included in the superconducting electromagnet device according to the fourth embodiment. As illustrated in FIG. 14, the cooling cylinder 13C is provided with a plurality of fins 21 on the outer peripheral surface of the peripheral wall 15 so as to increase the heat exchange area with the refrigerant gas 1G. In the present embodiment, each fin 21 is provided between adjacent openings 16 in the circumferential direction of the peripheral wall 15 and is configured to extend toward the bottom 14 of the cooling cylinder 13C. Each fin 21 has a flat plate shape, but it may have a corrugated shape or the other shape that can increase the heat exchange area with the refrigerant gas 1G. Further, each fin 21 may be provided with a protrusion configured to guide the refrigerant gas 1G to flow through the opening 16.

In the superconducting electromagnet device according to the present embodiment, the refrigerant 1 recondensed by the heat exchanger 11 is accumulated by the surface tension in the groove 22 provided in the fin 12. As a result, the liquid film of the refrigerant 1 recondensed at a location other than the groove 22 of the fin 12 becomes thinner, which makes it possible to reduce the thermal resistance of the liquid film. Accordingly, it is possible to reduce the condensation thermal resistance of the heat exchanger 11, which makes it possible to increase the amount of the refrigerant gas 1G to be recondensed per unit time.

Further, since the plurality of fins 21 are provided on the outer peripheral surface of the peripheral wall 15 of the cooling cylinder 13C, it is possible to increase the heat exchange area between the cooling cylinder 13C and the refrigerant gas 1G present around the heat exchanger 11. Thus, it is possible to reduce the convection heat resistance of the heat exchanger 11. As a result, it is possible to reduce the condensation thermal resistance of the heat exchanger 11, which makes it possible to increase the amount of the refrigerant gas 1G to be recondensed per unit time.

It should be understood that the embodiments disclosed herein have been presented for the purpose of illustration but not limited in all aspects. It is intended that the scope of the present invention is not limited to the description above but defined by the scope of the claims and encompasses all modifications equivalent in meaning and scope to the claims. The configurations described in the description of the embodiments may be combined unless they are inconsistent to each other.

REFERENCE SIGNS LIST

1: refrigerant; 1G: refrigerant gas; 2: superconducting coil; 3: refrigerant container; 4: radiation shield; 5: vacuum chamber; 6: refrigerator housing pipe; 7: thermal anchor; 8: refrigerator; 9: first refrigeration stage; 10: second refrigeration stage; 11: heat exchanger; 12, 21: fin; 13, 13A, 13B, 13C: cooling cylinder; 14: bottom; 15: peripheral wall; **15*f*: flange; 15*t*: lid; 16: opening; 16A: drainage tube; 17: upper end; 18: connection conductor; 19: insertion opening; 20: sealing material; 22: groove; 100**: superconducting electromagnet device

The invention claimed is:

1. A superconducting electromagnet device comprising:
a superconducting coil;
a refrigerant container which accommodates refrigerant that cools the superconducting coil, the refrigerant container in direct contact with the refrigerant;
a refrigerator having a refrigeration stage;
a heat exchanger which is disposed inside the refrigerant container and connected to the refrigeration stage to cool refrigerant gas vaporized from liquid refrigerant; and
a cooling cylinder which has a bottom and a peripheral wall erected from an outer edge of the bottom, and is arranged inside the refrigerant container to surround the heat exchanger,
the cooling cylinder including at least an opening, through which the refrigerant gas flows, in the peripheral wall and storing the liquid refrigerant recondensed by the heat exchanger on the bottom wherein the at least an opening includes a plurality of openings at intervals along circumference of the peripheral wall.

2. The superconducting electromagnet device according to claim 1, wherein
the cooling cylinder is connected to one of the refrigeration stage and the heat exchanger.

3. The superconducting electromagnet device according to claim 1, wherein
the cooling cylinder is connected to the refrigerant container.

4. The superconducting electromagnet device according to claim 3, wherein
the refrigeration stage is disposed outside the refrigerant container, and
the heat exchanger and the refrigeration stage are connected to each other by a connection conductor.

5. The superconducting electromagnet device according to claim 1, wherein
the heat exchanger has a fin extending toward the bottom, and
a surface of the fin including a plurality of grooves.

6. The superconducting electromagnet device according to claim 1, wherein
the cooling cylinder has a fin on an outer peripheral surface of the peripheral wall.

7. The superconducting electromagnet device according to claim 2, wherein
the heat exchanger has a fin extending toward the bottom, and
a plurality of grooves are on a surface of the fin.

8. The superconducting electromagnet device according to claim 3, wherein
the heat exchanger has a fin extending toward the bottom, and
a plurality of grooves are on a surface of the fin.

9. The superconducting electromagnet device according to claim 4, wherein
the heat exchanger has a fin extending toward the bottom, and
a plurality of grooves are on a surface of the fin.

10. The superconducting electromagnet device according to claim 2, wherein the cooling cylinder has a fin on an outer peripheral surface of the peripheral wall.

11. The superconducting electromagnet device according to claim 3, wherein the cooling cylinder has a fin on an outer peripheral surface of the peripheral wall.

12. The superconducting electromagnet device according to claim 4, wherein the cooling cylinder has a fin on an outer peripheral surface of the peripheral wall.

13. The superconducting electromagnet device according to claim 5, wherein the cooling cylinder has a fin on an outer peripheral surface of the peripheral wall.

14. The superconducting electromagnet device according to claim 7, wherein the cooling cylinder has a fin on an outer peripheral surface of the peripheral wall.

15. The superconducting electromagnet device according to claim 8, wherein the cooling cylinder has a fin on an outer peripheral surface of the peripheral wall.

16. The superconducting electromagnet device according to claim 9, wherein the cooling cylinder has a fin on an outer peripheral surface of the peripheral wall.

* * * * *